(12) United States Patent
Cui et al.

(10) Patent No.: US 10,251,183 B2
(45) Date of Patent: *Apr. 2, 2019

(54) DEVICE AND METHOD FOR CONFIGURING ALMOST BLANK SUBFRAME AND HETEROGENEOUS WIRELESS COMMUNICATION NETWORK

(71) Applicant: Sony Corporation, Tokyo (JP)

(72) Inventors: Qimei Cui, Beijing (CN); Hui Tian, Beijing (CN); Meng Wang, Beijing (CN); Peng Tian, Beijing (CN); Liqi Gao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,708

(22) Filed: Feb. 9, 2018

(65) Prior Publication Data

US 2018/0167951 A1 Jun. 14, 2018

Related U.S. Application Data

(63) Continuation of application No. 14/758,422, filed as application No. PCT/CN2013/086308 on Oct. 31, 2013, now Pat. No. 9,936,513.

(30) Foreign Application Priority Data

Nov. 28, 2012 (CN) .......................... 2012 1 0495977

(51) Int. Cl.
*H04W 4/00* (2018.01)
*H04W 72/08* (2009.01)
(Continued)

(52) U.S. Cl.
CPC ........ *H04W 72/082* (2013.01); *H04B 17/345* (2015.01); *H04L 1/00* (2013.01);
(Continued)

(58) Field of Classification Search
CPC ... H04W 72/082; H04W 24/02; H04W 52/24; H04W 72/04; H04W 24/10; H04W 84/045; H04W 92/20
See application file for complete search history.

(56) References Cited

U.S. PATENT DOCUMENTS 8,423,072 B2 4/2013 Whinnett
9,055,478 B2 6/2015 Goldhamer
(Continued)

FOREIGN PATENT DOCUMENTS

CA 2 795 976 A1 5/2013
CN 102333378 1/2012
(Continued)

OTHER PUBLICATIONS

International Search Report dated Feb. 20, 2014 in PCT/CN2013/086308 Filed Oct. 31, 2013.
(Continued)

*Primary Examiner* — Maharishi V Khirodhar
(74) *Attorney, Agent, or Firm* — Xsensus, LLP

(57) ABSTRACT

An apparatus and a method for a wireless communication network. The apparatus includes circuitry configured for acquiring the first information associated with an indicator indicating communication quality of user terminals served by an interfering base station; acquiring second information associated with an indicator indicating interfered degree of user terminals interfered by the interfering base station; configuring, based on the first information and the second information, transmission of the interfering base station for inter-base station coordination. The technical solution improves the overall performance of the wireless communication heterogeneous network.

11 Claims, 8 Drawing Sheets

(51) Int. Cl.

| | | |
|---|---|---|
| *H04W 72/04* | (2009.01) | |
| *H04L 1/00* | (2006.01) | |
| *H04W 24/02* | (2009.01) | |
| *H04W 52/24* | (2009.01) | |
| *H04B 17/345* | (2015.01) | |
| *H04W 84/04* | (2009.01) | |
| *H04W 24/10* | (2009.01) | |
| *H04W 92/20* | (2009.01) | |

(52) U.S. Cl.
CPC ......... *H04W 24/02* (2013.01); *H04W 52/244* (2013.01); *H04W 72/04* (2013.01); *H04W 24/10* (2013.01); *H04W 84/045* (2013.01); *H04W 92/20* (2013.01)

(56) References Cited

U.S. PATENT DOCUMENTS

| | | | |
|---|---|---|---|
| 9,936,513 B2* | 4/2018 | Cui | H04W 72/082 |
| 2008/0146154 A1 | 6/2008 | Claussen | |
| 2012/0113812 A1* | 5/2012 | Ji | H04W 72/1263 |
| | | | 370/241 |
| 2012/0122503 A1* | 5/2012 | Ma | H04W 16/10 |
| | | | 455/501 |
| 2012/0207025 A1* | 8/2012 | Barbieri | H04L 1/20 |
| | | | 370/236 |
| 2013/0010713 A1* | 1/2013 | Folke | H04W 72/085 |
| | | | 370/329 |
| 2013/0058234 A1 | 3/2013 | Yang | |
| 2013/0114434 A1 | 5/2013 | Muruganathan | |
| 2013/0170423 A1 | 7/2013 | Abe et al. | |
| 2014/0024388 A1 | 1/2014 | Earnshaw | |
| 2014/0029507 A1 | 1/2014 | Dimou | |
| 2014/0106769 A1 | 4/2014 | Bai | |
| 2015/0126237 A1* | 5/2015 | Nagata | H04W 52/54 |
| | | | 455/522 |

FOREIGN PATENT DOCUMENTS

| | | |
|---|---|---|
| CN | 102440050 A | 5/2012 |
| CN | 102711169 | 10/2012 |
| CN | 102761973 A | 10/2012 |
| WO | WO 2011/118212 A1 | 9/2011 |
| WO | WO 2011/162182 A1 | 12/2011 |

OTHER PUBLICATIONS

Kazutaka Nakamura, et al., "Network Assisted Downlink Interference Mitigation Methods for Home Base Station in LTE-Advanced", IEICE Technical Report, vol. 109, No. 341, RCS2009-167-RCS2009-206, 2009, pp. 61-66 and Cover Page (with English Abstract).

"Signaling enhancements to support non-zero transmit power in ABS operation" Research in Motion UK Limited, 3GPP TSG-RAN WG1 #68, R1-120334, 2002, 3 Pages.

"Further considerations on enhancement of ABS resource status", Renesas Mobile Europe Ltd, 3GPP TSG RAN WG1 Meeting #70, R1-123577, 2012, 3 Pages.

Examination Report No. 1 for Standard Patent Application—Australian Application No. 2016247093 dated Oct. 27, 2017, 4 pages.

Combined Chinese Office Action and Search Report dated May 4, 2018 in Patent Application No. 201210495977.6 (with English language translation of categories of cited documents), citing documents AA, AO and AP therein, 9 pages.

\* cited by examiner

| POWER REDUCTION AMOUNT (dB) | 0 | 2 | 4 | 6 | 8 | 10 | 12 | ZERO POWER |
|---|---|---|---|---|---|---|---|---|
| SILENCE RATIO (%) | 100 | 87.5 | 75 | 62.5 | 50 | 37.5 | 25 | 12.5 |

Fig. 2

| POWER REDUCTION AMOUNT (dB) | 0 | 2 | 4 | 6 | 8 | 10 | 12 | ZERO POWER |
|---|---|---|---|---|---|---|---|---|
| SILENCE RATIO (%) | 80 | 70 | 60 | 50 | 40 | 30 | 20 | 10 |

Fig. 3

DEVICE AND METHOD FOR CONFIGURING ALMOST BLANK SUBFRAME AND HETEROGENEOUS WIRELESS COMMUNICATION NETWORK

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The present disclosure relates generally to the field of wireless communication, and more particularly, to an apparatus for configuring Almost Blank Subframe (ABS) in a wireless communication heterogeneous network, a wireless communication heterogeneous network, and a method for configuring Almost Blank Subframe (ABS) in a wireless communication heterogeneous network.

BACKGROUND OF THE INVENTION

In long term evolution-advanced (LTE-A) of universal mobile telecommunications system (UMTS), higher requirements are put forward on the performance of cell-edge users. For example, in the scenario in which a macro base station and a home base station coexist in a LTE-A system, if the home base station adopts a way of closed user group access, the edge user that is not in access list and is served by the macro base station will be interfered with seriously, or even cannot be served at all. The application of almost blank subframe (ABS) technology in this kind of scenarios greatly improves the performance of edge users of the macro base station, and has become a focus of LTE-A interference coordination research.

The ABS technology inserts ABSs in normal subframes transmitted by the base station as an interference source according to design pattern. The configuration performed on ABSs includes configuring three parameters of silence ratio of ABS, transmission power reduction amount of ABS, and design pattern. In ABS, the transmission power of an interfering base station is set to zero or other predetermined reduction amount according to configured parameters, thus to reduce interference on the edge user that is not served by the interfering base station but is served by an interfered base station, so as to improve the edge performance of the interfered base station.

SUMMARY OF THE INVENTION

However, the current ABS technology inevitably brings about loss of total throughput of the interfering base station when the edge performance of the interfered base station is improved. The current ABS technology adopts an overall configuration scheme when configuring parameters of ABS, as a result, a better configuration can only be realized based on overall evaluation, and the ABS is not configured according to specific situation, thus, a tradeoff between the edge performance of the interfered base station and the total throughput of the interfering base station is not made according to specific situation.

Accordingly, there is a need to provide an apparatus for configuring ABS in a wireless communication heterogeneous network, a wireless communication heterogeneous network, and a method for configuring ABS in a wireless communication heterogeneous network, thus to configure ABS according to specific situation, and make a tradeoff between the edge performance of the interfered base station and the total throughput of the interfering base station, so as to improve the overall performance of the wireless communication heterogeneous network.

According to an embodiment of the present disclosure, there is provided an apparatus in a wireless communication heterogeneous network, comprising circuitry, configured to acquire first information associated with an indicator indicating communication quality of user terminals served by an interfering base station; acquire second information associated with an indicator indicating interfered degree of user terminals interfered by the interfering base station; and configure, based on the first information and the second information transmission of the interfering base station for inter-base station coordination.

According to another embodiment of the present disclosure, there is further provided a wireless communication heterogeneous network, comprising: a first base station comprising a first information acquisition unit and a configuration unit, and a second base station comprising a second information acquisition unit. The first information acquisition unit is configured to acquire first information associated with an indicator indicating communication quality of user terminals served by the first base station. The second information acquisition unit is configured to acquire second information associated with an indicator indicating interfered degree of user terminals served by the second base station and interfered by the first base station. The configuration unit is configured to configure, based on the first information and the second information, transmission of the interfering base station for inter-base station coordination.

According to another embodiment of the present disclosure, there is further provided a wireless communication heterogeneous network, comprising: a first base station comprising a first information acquisition unit and a second base station comprising a second information acquisition unit and a configuration unit. The first information acquisition unit is configured to acquire first information associated with an indicator indicating communication quality of user terminals served by the first base station. The second information acquisition unit is configured to acquire second information associated with an indicator indicating interfered degree of user terminals served by the second base station and interfered by the first base station. The configuration unit is configured to configure, based on the first information and the second information, transmission of the interfering base station for inter-base station coordination.

According to still another embodiment of the present disclosure, there is further provided a method in a wireless communication network, comprising: acquiring first information associated with an indicator indicating communication quality of a user terminal served by an interfering base station; acquiring second information associated with an indicator indicating interfered degree of a user terminal interfered by the interfering base station; and configuring, based on the first information and the second information, transmission of the interfering base station for inter-base station coordination.

According to an embodiment of the present disclosure, there is provided another an apparatus in a wireless communication network, comprising circuitry, configured to acquire Reference Signal Receiving Power (RSRP) of a reference signal from an interfering base station measured by interfered user terminals served by the apparatus; and provide information associated with the RSRP via X2 interface to the interfering base station for inter-base station coordination.

According to still another embodiment of the present disclosure, there is further provided a program causing a computer to execute the following steps: acquiring first information associated with an indicator indicating communication quality of a user terminal served by an interfering base station; acquiring second information associated with an indicator indicating interfered degree of a user terminal and interfered by the interfering base station; and configuring, based on the first information and the second information, the ABS sent by the interfering base station by adjusting at least one of silence ratio and power reduction amount of ABS.

According to an embodiment of the present disclosure, there is further provided a corresponding computer readable storage medium on which a program that can be executed by a computing device is stored, when being executed, the program can cause the computing apparatus to execute the above method.

The provided apparatus for configuring ABS in a wireless communication heterogeneous network, the wireless communication heterogeneous network, and the method for configuring ABS in a wireless communication heterogeneous network according to embodiments of the present disclosure can configure the ABS according to specific situation, considering both the performance of the user terminal served by the interfering base station and the performance of the user terminal interfered with by the interfering base station, thus to improve overall performance of the wireless communication heterogeneous network.

BRIEF DESCRIPTION OF THE DRAWINGS

FIG. 2 is a schematic diagram illustrating an example of the parameter table including predetermined parameter pairs consisted of silence ratio and power reduction amount of ABS according to an embodiment of the present disclosure;

FIG. 3 is a schematic diagram illustrating another example of the parameter table including predetermined parameter pairs consisted of silence ratio and power reduction amount of ABS according to an embodiment of the present disclosure;

DETAILED DESCRIPTION OF THE INVENTION

Hereinafter, preferred embodiments of the present disclosure will be described in conjunction with the accompanying drawings, and thus other objects, features, and advantages of the technique disclosed in this specification will become more apparent.

The following description will be performed in the following order:

1. Apparatus for configuring ABS in a wireless communication heterogeneous network
2. Wireless communication heterogeneous network
3. Method for configuring ABS in a wireless communication heterogeneous network
4. Specific examples
5. Hardware configuration example

Figure 1:
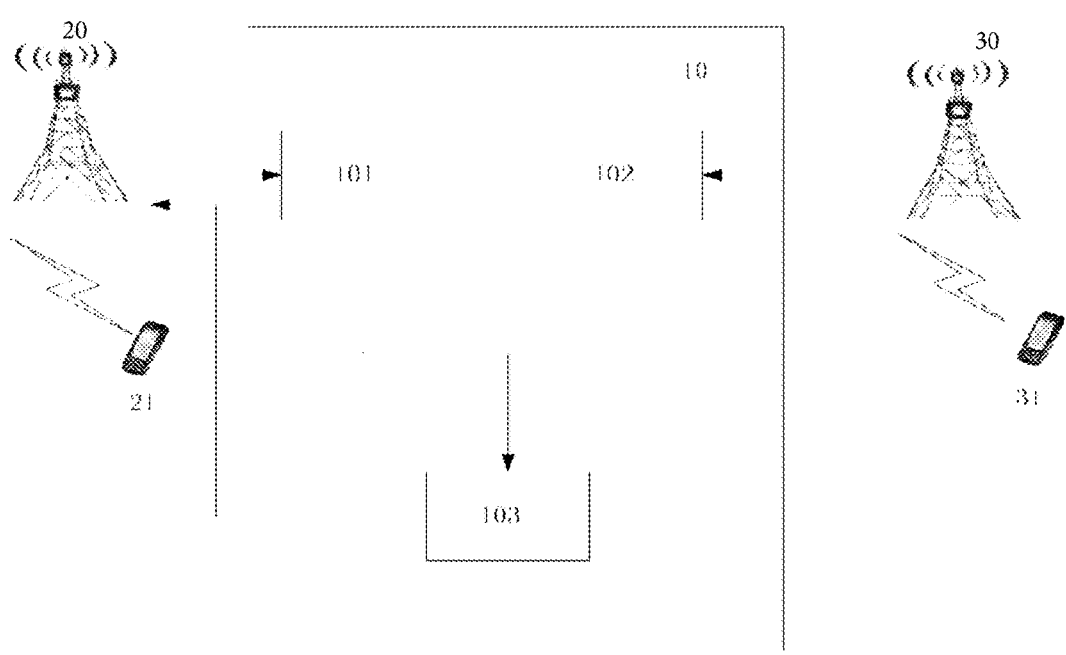
FIG. 1 is a schematic diagram illustrating an example of the apparatus for configuring ABS in a wireless communication heterogeneous network according to an embodiment of the present disclosure.

1. Apparatus for Configuring ABS in a Wireless Communication Heterogeneous Network FIG. 1 illustrates apparatus 10 for configuring ABS in a wireless communication heterogeneous network according to an embodiment of the present disclosure. The apparatus 10 includes a first information acquisition unit 101, a second information acquisition unit 102 and a configuration unit 103.

In addition, FIG. 1 illustrates an interfering base station 20, a user terminal 21 served by the interfering base station 20, a interfered user terminal 31, and a base station 30 that provides service to the interfered user terminal 31. The interfering base station 20 and the base station 30 serving the user terminal 31 constitute a heterogeneous wireless communication network. Herein, the term "heterogeneous network" refers to a network including different types of base stations, which may be a macro base station, home base station, pico (Pico) base station, or other suitable type of base station.

It should be noted that, the user terminal 21 served by the interfering base station 20 may be one or more terminals, and are referred collectively as the user terminal 21 herein. Similarly, the interfered user terminal 31 may be one or more terminals, and are referred collectively as the user terminal 31. The user terminal may be a mobile phone, notebook computer, desktop personal computer or other suitable type of user terminal having a communication function.

The first information acquisition unit 101 is configured to acquire a first information, the first information is associated with an indicator indicating the communication quality of the user terminal 21, and can be, for example, the indicator indicating the communication quality of the user terminal 21 itself or a value obtained based on the indicator.

The second information acquisition unit 102 is configured to acquire a second information, the second information is associated with an indicator indicating the interfered degree of the user terminal 31, and can be, for example, the indicator indicating the interfered degree of the user terminal 31 itself or a value obtained based on the indicator.

The configuration unit 103 is configured to configure, based on the first information and the second information, the ABS sent by the interfering base station 20 by adjusting at least one of silence ratio and power reduction amount of ABS Those skilled in the art should understand that, the apparatus 10 can be disposed independently of the interfering base station 20 and the base station 30, or can be disposed inside the interfering base station 20 or the base station 30, in addition, a part of the apparatus 10 can be disposed in the interfering base station 20, and the other part of the apparatus 10 can be disposed in the base station 30. Furthermore, the entire apparatus 10 can be disposed in the interfering base station 20, wherein, the second information acquisition unit 102 acquires the second information through the communication between the interfering base station 20 and the base station 30 via X2 interface, for example. As another possible way, the entire apparatus 10 can be disposed in the base station 30, wherein, the first information acquisition unit 101 acquires the first information through the communication between the interfering base station 20 and the base station 30 via X2 interface, for example, and the configuration unit 103 performs configuration on ABS sent by the interfering base station 20 through the communication between the interfering base station 20 and the base station 30 via X2 interface, for example. Therefore, a base station comprising the apparatus 10 is disclosed according to an embodiment of the present disclosure.

Preferably, the indicator indicating the communication quality of the user terminal 21 can be associated with at least one of the Reference Signal Receiving Power (RSRP), the communication quality indicator (CQI), the Reference Signal Receiving Power based on the channel state information (CSI-RSRP), and the coupling loss of link when the user terminal 21 is receiving the signal from the interfering base station 20. In other words, the indicator can be associated with only one of the Reference Signal Receiving Power, the communication quality indicator, the Reference Signal Receiving Power based on the channel state information, and the coupling loss of link when the user terminal 21 is receiving the signal from the interfering base station 20, or can be associated with any number of them, for example, it can be a weighted sum of a plurality of the parameters.

It should be noted that, the indicator indicating the communication quality of the user terminal 21 can be associated with the Reference Signal Receiving Power in the previous versions of 3GPP Release 10, for example, the Reference Signal herein may be a cell-specific reference signal (CRS). However, since the usage of reception power with respect to the cell-specific reference signal cannot satisfy the channel measurement in heterogeneous network scenarios in 3GPP Release 10 and later versions and in the new carrier type, the indicator indicating the communication quality of the user terminal 21 can be associated with the Reference Signal Receiving Power based on the channel state information in these scenarios.

Those skilled in the art should understand that the indicator indicating the communication quality of the user terminal 21 can also be associated with other suitable parameters.

Additionally, the indicator indicating the communication quality of the user terminal 21 can be measured by the user terminal 21 and provided to the interfering base station 20. The interfering base station 20 provides the first information associated with the indicator to the configuration unit 103. Specially, when the configuration unit 103 is disposed in the base station 30, the interfering base station 20 provides the first information to the configuration unit 103 through the communication between base stations via X2 interface, for example.

Those skilled in the art should understand that, the indicator indicating the communication quality of the user terminal 21 can also be measured in other ways, for example, be measured by the interfering base station 20.

Preferably, the indicator indicating interfered degree of the user terminal 31 can be associated with at least one of the Reference Signal Receiving Power, the communication quality indicator, the Reference Signal Receiving Power based on the channel state information, and the coupling loss of link when the user terminal 31 is receiving the signal from the interfering base station 20. In other words, the indicator can be associated with only one of the Reference Signal Receiving Power, the communication quality indicator, the Reference Signal Receiving Power based on the channel state information, and the coupling loss of link when the user terminal 31 is receiving the signal from the interfering base station 20, or can be associated with any number of them, for example, can be a weighted sum of a plurality of parameters.

As mentioned above, the indicator indicating interfered degree of the user terminal 31 can be associated with the Reference Signal Receiving Power. In 3GPP Release 10 and later versions, and in the new carrier type, the indicator indicating interfered degree of the user terminal 31 can be associated with the Reference Signal Receiving Power based on the channel state information.

Those skilled in the art should understand that the indicator indicating interfered degree of the user terminal 31 can also be associated with other suitable parameters.

Additionally, the indicator indicating interfered degree of the user terminal 31 can be measured by the user terminal 31 and provided to the base station 30. The base station 30 provides the second information associated with the indicator to the configuration unit 103. Especially, when the configuration unit 103 is disposed in the interfering base station 20, the base station 30 provides the second information to the configuration unit 103 through the communication between base stations via X2 interface, for example.

Those skilled in the art should understand that the indicator indicating the interfered degree of the user terminal 31 can also be measured in other ways, for example, can be measured by the base station 30.

Preferably, the configuration unit 103 is further configured to configure the ABS sent by the interfering base station 20 by performing selection in the parameter table including the predetermined parameter pairs consisted of silence ratio and power reduction amount of ABS.

Specifically, in case that the power reduction amount of ABS is unchanged, when the silence ratio of ABS is increased, the total throughput of the interfering base station 20 is reduced and the performance of edge user that is interfered with by the interfering base station 20 and served by the base station 30 (that is, the edge performance of the base station 30) is improved, and vice versa. Furthermore, in case that the silence ratio of ABS is unchanged, when the power reduction amount of ABS is increased, the total throughput of the interfering base station 20 is reduced, and the edge performance of the base station 30 is improved, and vice versa.

The total throughput of the interfering base station 20 and the edge performance of the base station 30 can be configured by appropriately setting predetermined parameter pairs consisted of silence ratio and power reduction amount of ABS, so as to improve the total performance of the wireless communication heterogeneous network.

The configuration unit 103 can configure the ABS sent by the interfering base station 20 in other ways, for example, changing one of silence ratio and power reduction amount of ABS at the same time when the other is not changed, that is, either one of silence ratio and power reduction amount of ABS is adjusted.

FIG. 2 and FIG. 3 illustrate two examples of parameter table including predetermined parameter pairs consisted of silence ratio and power reduction amount of ABS.

In the parameter table illustrated in FIG. 2, eight pairs of parameters are schematically illustrated, wherein, the higher the silence ratio is, the smaller the power reduction amount is, whereas, the lower the silence ratio is, the larger the power reduction amount is. When the silence ratio is 100%, the power reduction amount of ABS is 0, at this time, all sent by the interfering base station 20 are ABS, and no normal subframe is sent, therefore, the user terminal 21 is not served. When the silence ratio is 12.5%, the power reduction amount of ABS is lowered to 0 (ie., "zero power" in the rightmost of the first line of the table in FIG. 2). When the power of ABS sent by the interfering base station 20 is lowered to 0, the ABS sent by the interfering base station 20 will not interfered substantially by the subframe sent from the base station 30 in the same time period, such that the edge performance of the base station 30 can be improved better in case that the silence ratio of ABS is unchanged.

Those skilled in the art should understand that, the parameter table in practical application can be designed according to design requirement, including other number of parameter pair.

It should be noted that, in the parameter pair shown in FIG. 2, setting the parameter pair consisted of silence ratio and power reduction amount to a parameter pair with smaller silence ratio and larger power reduction amount will make the edge performance of the base station 30 better and the total throughput of the interfering base station 20 smaller. However, those skilled in the art can appropriately set the predetermined parameter pair consisted of silence ratio and power reduction amount of ABS according to specific network scenario. For example, two parameter pairs are set to have big difference between their silence ratios while have small difference between their power reduction amounts, therefore, in some network scenarios, the parameter pair with smaller silence ratio and slightly larger power reduction amount is adopted such that the edge performance of the base station 30 is slightly poor and the total throughput of the interfering base station 20 is larger. In addition, in case that the total throughput of the interfering base station 20 and the edge performance of the base station 30 are required to be varied in a larger range, the parameter pair can be set such that the larger the silence ratio is, the larger the power reduction amount is, therefore, the parameter pair with larger silence ratio and larger power reduction amount can greatly improve the edge performance of the base station 30 and lower the total throughput of the interfering base station 20.

In the parameter table illustrated in FIG. 3, eight pairs of parameters are schematically illustrated, wherein, similar to FIG. 2, the higher the silence ratio is, the smaller the power reduction amount is, and conversely, the lower the silence ratio is, the larger the power reduction amount is. When the silence ratio is 80%, the power reduction amount of ABS is 0. When the silence ratio is 10%, the power reduction amount of ABS is lowered to 0 (ie., "zero power" in the rightmost of the first line of the table in FIG. 3). The parameter table illustrated in FIG. 3 can be applied to, for example, the scenario where the interfering base station 20 is a macro base station and the base station 30 is a pico base station. In the scenario, the ratio by which the macro base station sends ABS cannot reach 100%, otherwise, the macro base station which is the main serving base station of the heterogeneous network cannot work normally. Those skilled in the art can set parameter pairs correspondingly according to features of other application scenarios, especially, the type of the interfering base station. In other words, the above parameter pair is determined from the type of the interfering base station.

Preferably, the configuration unit 103 can be configured to compare the first information and the second information with the first reference range including the lower limit of the communication quality of the user terminal 21 and the second reference range including the upper limit of the interfered degree of the user terminal 31, respectively, and the ABS sent by the interfering base station 20 is configured according to the result of comparison between the first information and the first reference range and the result of comparison between the second information and the second reference range, in such a manner that the first information and the second information are within the first reference range and the second reference range respectively.

Furthermore, the configuration unit 103 can be configured to adjust the first reference range and the second reference range according to indicators indicating characteristics of the user terminal 21 and the user terminal 31, so as to configure the ABS sent from the interfering base station according to the result of comparison between the first information and the first reference range and the result of comparison between the second information and the second reference range.

In other words, the first reference range and the second reference range can be set respectively for the first information and the second information, the ABS is configured such that the first information and the second information is maintained in the first reference range and the second reference range respectively, so the configuration on ABS can be performed according to specific situation. The first reference range and the second reference range can be adjusted according to the indicator indicating characteristics of the user terminal 21 and the user terminal 31, such that a tradeoff between the total throughput of the interfering base station 20 and the edge performance of the base station 30 can be made according to specific situation. Furthermore, the reference range can be adjusted according to other suitable indicators, or can be set to a fixed reference range.

Not only the first reference range and the second reference range can be set respectively with respect to the first information and the second information, but also a common reference range can be set with respect to an amount relevant to the first information and the second information, for example, a common reference range can be set with respect to the weighted sum of the first information and the second information.

Furthermore, when the reference range is adjusted according to above indicators, the reference range for the first information and the reference range for the second information can be adjusted according to above indicators respectively, and the reference range for both the first information and the second information can be adjusted according to above indicators.

As for those skilled in the art, the ABS can be configured based on the first information, the second information, and the indicators indicating characteristics of the user terminal 21 and the user terminal 31 by suitable ways other than the way of setting the reference range for the first information and the second information, so as to make a tradeoff between the total throughput of the interfering base station 20 and the edge performance of the base station 30 according to specific situation. For example, a reference range can be set for the weighted sum of the first information, the second information, and the indicator indicating characteristics of the user terminal 21 and the user terminal 31, and the ABS is configured in such a manner that the weighted sum is maintained in the reference range.

The indicator indicating characteristics of the user terminal 21 and the user terminal 31 is associated with at least one of the amount of the user terminal 21, the amount of the user terminal 31, the traffic amount of the user terminal 21, and the traffic amount of the user terminal 31. In other words, the indicator indicating characteristics of the user terminal 21 and the user terminal 31 can be associated with only one of the amount of the user terminal 21, the amount of the user terminal 31, the traffic amount of the user terminal 21, and the traffic amount of the user terminal 31, or can be associated with any number of them. A specific example of the indicator indicating characteristics of the user terminal 21 and the user terminal 31 will be present subsequently.

The configuration unit 103 determines how to make a tradeoff between the edge performance of the base station 30 and the total throughput of the interfering base station 20 according to the indicator. In other words, the configuration unit 103 determines how to configure the ABS of the interfering base station 20 according to the indicator, thus to make a tradeoff between the total throughput of the interfering base station 20 and the edge performance of the base station 30 according to specific situation.

For example, the indicator can be associated with the amount of the user terminal 21, and when the amount of the user terminal 21 is increased, the ABS of the interfering base station 20 is configured in more consideration of the total throughput of the interfering base station 20. The indicator can also be associated with the amount of the user terminal 31, and when the amount of the user terminal 31 is increased, the ABS of the interfering base station 20 is configured in more consideration of the edge performance of the base station 30.

The indicator can also be associated with the relationship between the amount of the user terminal 21 and the amount of the user terminal 31, that is, the indicator can be associated with both the amount of the user terminal 21 and the amount of the user terminal 31. For example, when the ratio between the amount of the user terminal 21 and the amount of the user terminal 31 is increased, the ABS of the interfering base station 20 is configured in more consideration of the edge performance of the base station 30.

In other words, in the case that the indicator indicating the characteristic of the user terminal 31 and the user terminal 21 is positive correlated to the ratio of the amount of the user terminals 31 to the amount of the user terminals 21, the configuration unit 130 can be configured to decrease the lower limit of the communication quality of the user terminals 21 included in the first reference range and to decrease the upper limit of the interfered degree of the user terminals 31 included in the second reference range, when the indicator is increased.

Similarly, the indicator can be associated with the traffic amount of the user terminal 21, and when the traffic amount of the user terminal 21 is increased, the ABS of the interfering base station 20 is configured in more consideration of the total throughput. The indicator can also be associated with the traffic amount of the user terminal 31, and when the traffic amount of the user terminal 31 is increased, the ABS of the interfering base station 20 is configured in more consideration of the edge performance of the base station 30.

The indicator can also be associated with the relationship between the traffic amount of the user terminal 21 and the traffic amount of the user terminal 31, that is, it is associated with both the traffic amount of the user terminal 21 and the traffic amount of the user terminal 31. For example, when the ratio between the traffic amount of the user terminal 21 and the traffic amount of the user terminal 31 is lager, the ABS of the interfering base station 20 is configured in more consideration of the edge performance of the base station 30.

In other words, in the case that the indicator indicating the characteristic of the user terminal 31 and the user terminal 21 is positive correlated to the ratio of the traffic amount of the user terminals 31 to the traffic amount of the user terminals 21, the configuration unit 130 can be configured to decrease the lower limit of the communication quality of the user terminals 21 included in the first reference range, and to decrease the upper limit of the interfered degree of the user terminals 31 included in the second reference range, when the indicator is increased.

Of course, the indicator can also be associated with all of the amount of the user terminal 21, the amount of the user terminal 31, the traffic amount of the user terminal 21, and the traffic amount of the user terminal 31, for example, the indicator can be a weighted sum of the ratio between the amount of the user terminal 21 and the amount of the user terminal 31 and the ratio between the traffic amount of the user terminal 2l and the traffic amount of the user terminal 31.

Those skilled in the art should understand that, the indicator can also be associated with at least one of the amount of the user terminal 21, the amount of the user terminal 31, the traffic amount of the user terminal 21, and the traffic amount of the user terminal 31 according to other suitable manners, so as to make a tradeoff between the total throughput of the interfering base station 20 and the edge performance of the base station 30 according to specific situation through the indicator.

Furthermore, the indicator can also be associated with other suitable amounts that can indicate characteristics of the user terminal 21 and the user terminal 31, for example, be associated with the importance or the priority of the user terminal 21 and the user terminal 31, so as to make a tradeoff between the total throughput of the interfering base station 20 and the edge performance of the base station 30 according to specific situation through the indicator.

When the configuration unit 103 is disposed in the base station 30, the configuration unit 103 provides the information associated with the configuration scheme to the interfering base station 20 through the communication between the base stations via X2 interface, for example. Such as, the specific value of the selected parameter pair is provided to the interfering base station 20, or in the case that the parameter pair table is stored in the interfering base station 20, the number of the selected parameter pair is provided to the interfering base station 20. Furthermore, in the case that the parameter pair table (for example, the table illustrated in FIG. 2) is stored in the interfering base station 20, the relative position of the selected parameter pair relative to the parameter pair currently used by the interfering base station 20 is sent to the interfering base station 20, for example, the information indicating that the parameter pair will be shifted by one position in the direction in which the power reduction amount is relatively large and the silence ratio is relatively small is sent.

Configuring ABS can be performed periodically, or be performed in other suitable way, for example, be performed according to event trigger. A possible scenario performed according to event trigger is, when the interfering base station 20 detects that the change of the amount of the user terminals or the traffic amount satisfies a predetermined condition, the ABS is reconfigured.

When the silence ratio and the power reduction amount of the ABS is adjusted periodically according to the variation amount of the first information, in order to prevent the "ping-pong effect" (that is, when the above parameters of the ABS are adjusted towards the first direction, the above parameters of the ABS are re-adjusted towards the second direction opposite to the first direction because of the corresponding variation of the first information or the second information, and after that, because of the corresponding variation of the first information or the second information, the above parameters of the ABS needs to be adjusted towards the first direction again, and the process may be circled many times), the silence ratio and the power reduction amount of the ABS are not adjusted when the variation amount of the first information is small than a predetermined threshold.

Similarly, when the silence ratio and the power reduction amount of the ABS is adjusted periodically according to the variation amount of the second information, in order to prevent the "ping-pong effect", the silence ratio and the power reduction amount of the ABS are not adjusted when the variation amount of the second information is small than a predetermined threshold.

It should be noted that, the predetermined threshold set for the first information and the predetermined threshold set for the second information may be the same or different. Furthermore, the threshold can be set with respect to the relative variation amount of the first information and the second information, or be set with respect to the absolute variation amount of the first information and the second information.

Those skilled in the art can also adopt other ways to decrease the sensitivity of triggering reconfiguration of the ABS, thus to prevent the "ping-pong effect". For example, the sensitivity of adjusting the above parameters of the ABS towards one direction can be made different with the sensitivity of adjusting the above parameters of the ABS towards another direction, so as to prevent repetitive adjustment of the above parameters.

2. Wireless Communication Heterogeneous Network

Figure 4:
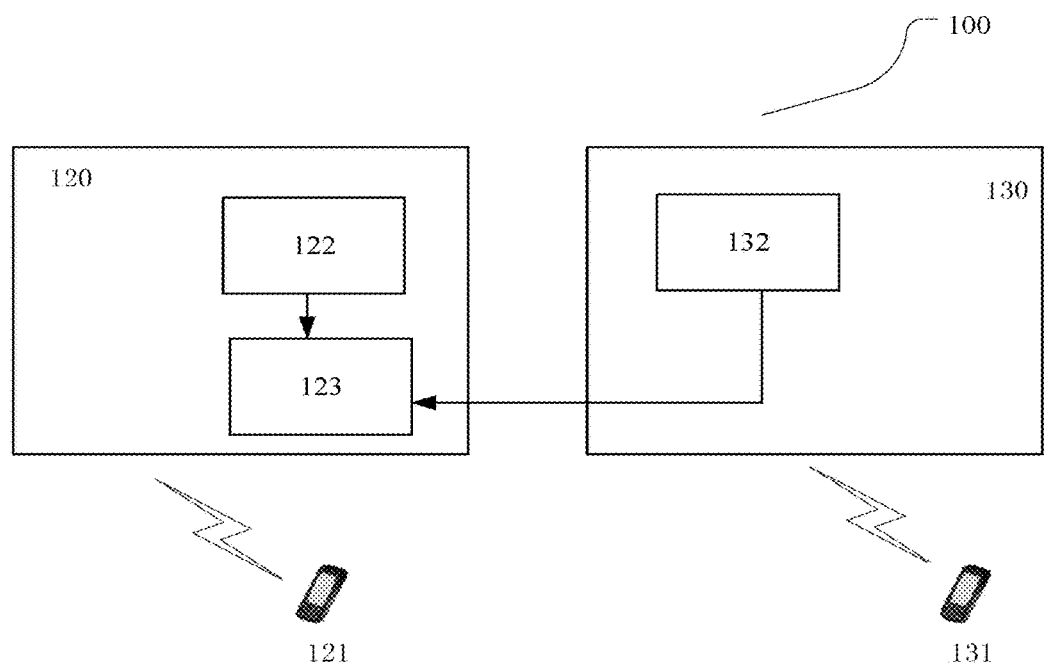
FIG. 4 is a schematic diagram illustrating an example of the wireless communication heterogeneous network according to an embodiment of the present disclosure.

FIG. 4 illustrates the wireless communication heterogeneous network 100 according to an embodiment of the present disclosure. As shown in FIG. 2, the network 100 comprises a first base station 120 and a second base station 130. The first base station 120 comprises a first information acquisition unit 122 and a configuration unit 123. The second base station 130 comprises a second information acquisition unit 132. In the system 100, the first base station 120 is an interfering base station, the user terminals served by the first base station 120 are referred to collectively as the user terminal 121, the user terminals served by the second base station 130 and interfered by the first base station 120 are referred to collectively as the user terminal 131. Similarly to the example of FIG. 1, the user terminal 121 and the user terminal 131 may be one or more user terminals respectively.

The first information acquisition unit 122 is configured to acquire the first information, the first information is associated with the indicator indicating the communication quality of the user terminal 121.

The second information acquisition unit 132 is configured to acquire the second information, the second information is associated with the indicator indicating the interfered degree of the user terminal 131 interfered by the first base station 120.

The configuration unit 123 is configured to configure, based on the first information and the second information, the ABS sent by the first base station 120 by adjusting at least one of the silence ratio and the power reduction amount of the ABS.

The first base station 120 may be a home base station, while the second base station 130 may be a macro base station. Also, the first base station 120 may be a macro base station, while the second base station 130 may be a pico base station. The second base station 130 can provide the second information to the first base station 120 through the X2 interface.

Figure 5:
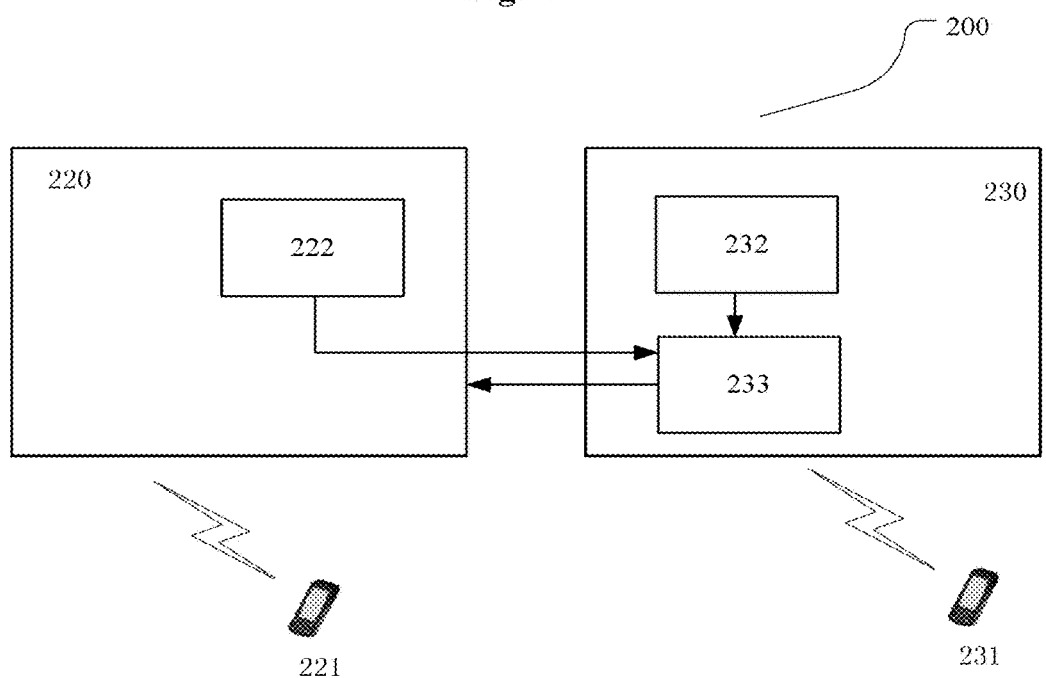
FIG. 5 is a schematic diagram illustrating another example of the wireless communication heterogeneous network according to an embodiment of the present disclosure.

FIG. 5 illustrates the wireless communication heterogeneous network 200 according to an embodiment of the present disclosure. As shown in FIG. 5, the network 200 comprises a first base station 220 and a second base station 230. The first base station 220 comprises a first information acquisition unit 222. The second base station 230 comprises a second information acquisition unit 232 and a configuration unit 233. In the system 200, the first base station 220 is an interfering base station, the user terminals served by the first base station 220 are referred to collectively as the user terminal 221, the user terminals served by the second base station 230 and interfered by the first base station 220 are referred to collectively as the user terminal 231. Similarly to examples of FIGS. 1 and 4, the user terminal 221 and the user terminal 231 may be one or more user terminals respectively.

The first information acquisition unit 222 is configured to acquire the first information, the first information is associated with the indicator indicating the communication quality of the user terminal 221.

The second information acquisition unit 232 is configured to acquire the second information, the second information is associated with the indicator indicating the interfered degree of the user terminal 231 interfered by the first base station 220.

The configuration unit 233 is configured to configure, based on the first information and the second information, the ABS sent by the first base station 220 by adjusting at least one of the silence ratio and the power reduction amount of the ABS.

If the first base station 220 is a home base station and the second base station 230 is a macro base station, the second base station 230 may provide the second information to the first base station 220 through the X2 interface, and the configuration unit 233 of the second base station 230 may configure the ABS sent by the first base station 220 through the X2 interface.

If the first base station 220 is a macro base station and the second base station 230 is a pico base station, the second base station 230 may provide the second information to the first base station 220 through the X2 interface, and the configuration unit 233 of the second base station 230 may configure the ABS sent by the first base station 220 through the X2 interface.

Figure 6:
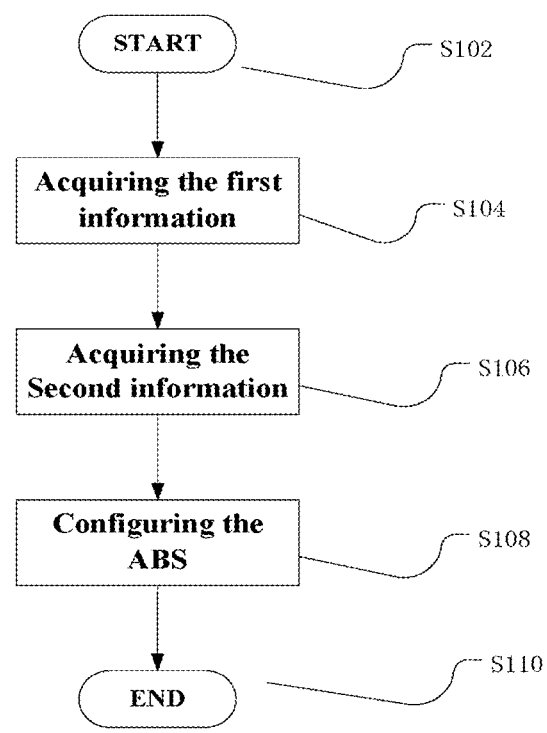
FIG. 6 is a flowchart illustrating the method for configuring ABS in a wireless communication heterogeneous network according to an embodiment of the present disclosure.

3. Method for Configuring ABS in a Wireless Communication Heterogeneous Network FIG. 6 illustrates the method for configuring ABS in a wireless communication heterogeneous network according to an embodiment of the present disclosure.

The above method begins at step S102.

In step S104, the first information associated with the indicator indicating the communication quality of the user terminal served by the interfering base station is acquired. For example, the step can be performed by the first information acquisition unit 101, 122 or 222.

In step S106, the second information associated with the indicator indicating the interfered degree of the user terminal interfered with by the interfering base station is acquired. For example, the step can be performed by the second information acquisition unit 102, 132 or 232.

In step S108, the ABS is configured, based on the first information and the second information, by adjusting at least one of the silence ratio and the power reduction amount of the ABS. For example, the step can be performed by the configuration unit 103, 123 or 233.

Subsequently, the process is ended at step S110.

It should be noted that, step S104 is not necessary to be performed before step S106, for example, step S106 may be performed before step S104, or, step S104 and step S106 may be performed in parallel.

4. Specific Examples

In the following, an implementation of embodiments of the present disclosure will be described in detail through more specific example.

Figure 7:
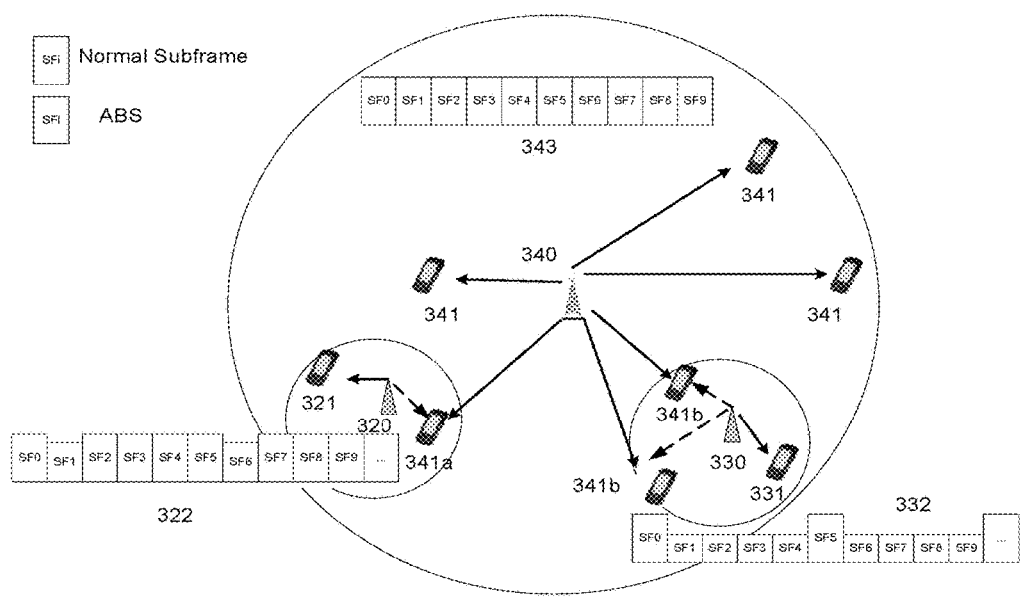
FIG. 7 is a schematic diagram illustrating a specific application example of the embodiment of the present disclosure.

FIG. 7 illustrates the scenario in which a macro base station and a home base station coexist. In the scenario, the home base station 320, 330 (as the interfering base station) that only serve users in a closed user list bring interference to the user terminal 341 of the macro base station 340.

Those skilled in the art should understand that, different base stations will interfere with each other, for example, a possible situation is that a macro base station 340 brings interference to the home base station 320 or 330. Those skilled in the art can select the way of sending ABS according to specific situation to restrain interference between base stations.

Through the description on the examples shown in FIG. 7, those skilled in the art will appreciate that the embodiments of the present disclosure can be embodied with respect to the wireless communication heterogeneous network including one or more interfering base stations. Wherein, with respect to individual interfering base station, the ABSs of all interfering base stations can be configured respectively by the method according to embodiments of the present disclosure, or, only the ABS of one or more interfering base stations can be configured respectively by the method according to embodiments of the present disclosure.

The macro base station 340 provides services to a plurality of user terminals 341, the user terminals 341 comprise the user terminal 341a and the user terminal 341b, wherein, the position of the user terminal 341a is close to the home base station 320 and is not within the user list of the home base station 320, therefore, the user terminal 341a is interfered by the home base station 320. While the position of the user terminal 341b is close to the home base station 330 and is not within the user list of the home base station 330, therefore, the user terminal 341b is interfered by the home base station 330.

It should be noted that, although one user terminal 341a and two user terminals 341b are illustrated in FIG. 7, those skilled in the art should understand that, the user terminal 341a and 341b may be one or more user terminals respectively.

The home base station 320 provides services to the user terminal 321 in the user list thereof, and the home base station 330 provides services to the user terminal 331 in the user list thereof. Those skilled in the art should understand that, the user terminal 321 and the user terminal 331 may be one or more user terminals respectively.

For the purpose of clarity, in FIG. 7, a solid line with an arrow represents that a base station provides services to the user terminal, and a broken line with an arrow represents that a base station brings interference on the user terminal.

Those skilled in the art should understand that, the apparatus 10 in FIG. 1 may be included in the macro base station 340, or be included in the home base station 320 or 330. Furthermore, as shown in FIG. 4, the home base station 320 and/or 330 as the interfering base station comprises the first information acquisition unit 122 and the configuration unit 123, and the macro base station 340 comprises the second information acquisition unit 132, or as shown in FIG. 5, the home base station 320 and/or 330 as the interfering base station comprises the first information acquisition unit 222, and the macro base station 340 comprises the second information acquisition unit 232 and the configuration unit 233.

The macro base station 340 sends subframes according to a design pattern 343, and it is observed from FIG. 7 that the subframes sent by the macro base station 340 are all normal subframes. The home base station 320 sends subframes according to a design pattern 322, and it is observed from FIG. 7 that the home base station 320 sends one ABS each time when sending four normal subframes. The home base station 330 sends subframes according to a design pattern 332, and it is observed from FIG. 7 that the home base station 330 sends four ABSs each time when sending one normal subframe.

With respect to different home base stations, different lists including parameter pairs consisted of silence ratio and power reduction amount of ABS can be used. For example, in the design patterns 322 and 332, the power of a subframe is schematically represented by the height of the subframe. It is observed from FIG. 7 that, the silence ratio of the ABS of the design pattern 322 is lower than that of the ABS of the design pattern 332, meanwhile, the power reduction amount of the ABS of the design pattern 322 compared to a normal subframe is smaller than that of the ABS of the design pattern 332. This means that, the parameter pairs for configuring the ABS of the home base station 320 and the parameter pairs for configuring the ABS of the home base station 330 come from different lists, because in the same list, the higher the silence ratio is, the lower the power reduction amount is.

According to embodiments of the present disclosure, the silence ratio and the power reduction amount by which the home base station 320 sends ABS and the silence ratio and the power reduction amount by which the home base station 330 sends ABS may be the parameter pairs in the lists shown in FIG. 2 or FIG. 3.

In the following, a specific example of the method by which the home base station 320 sending ABS is periodically configured in the example shown in FIG. 7 is described in conjunction with FIG. 8.

Figure 8:
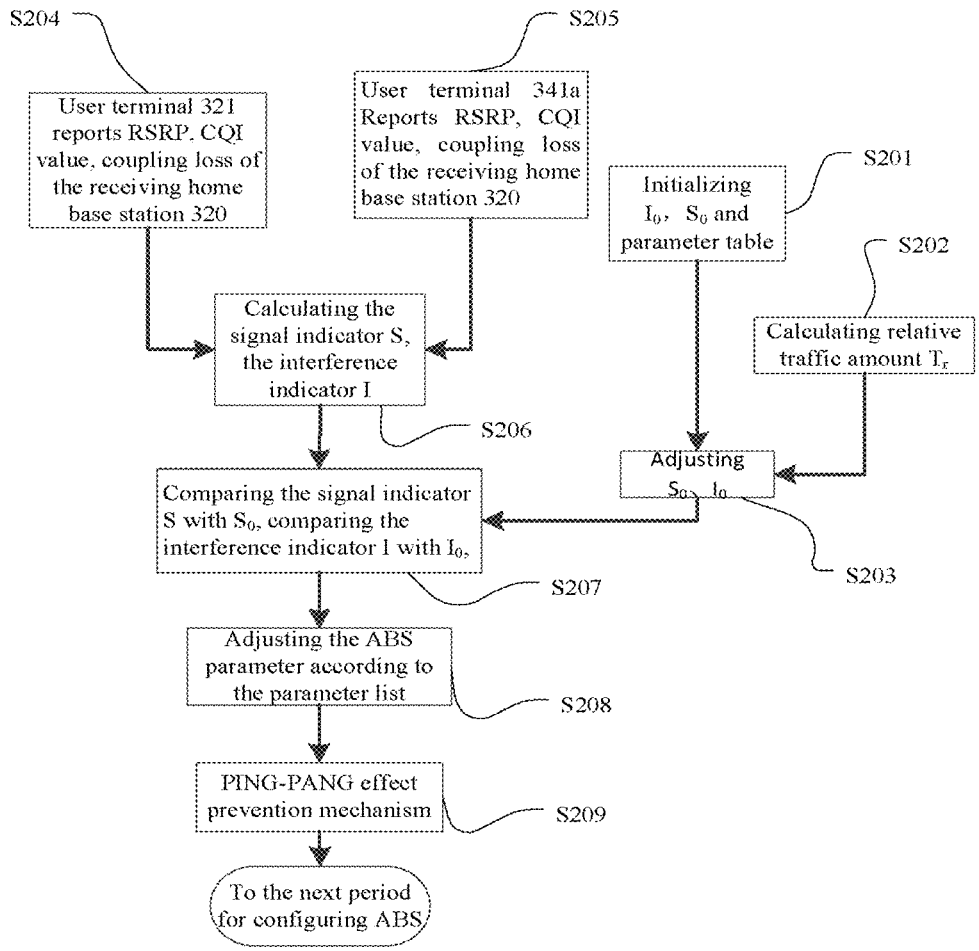
FIG. 8 is a schematic diagram illustrating how to configure the ABS of an interfering base station in the example of FIG. 7.
Figure 9:
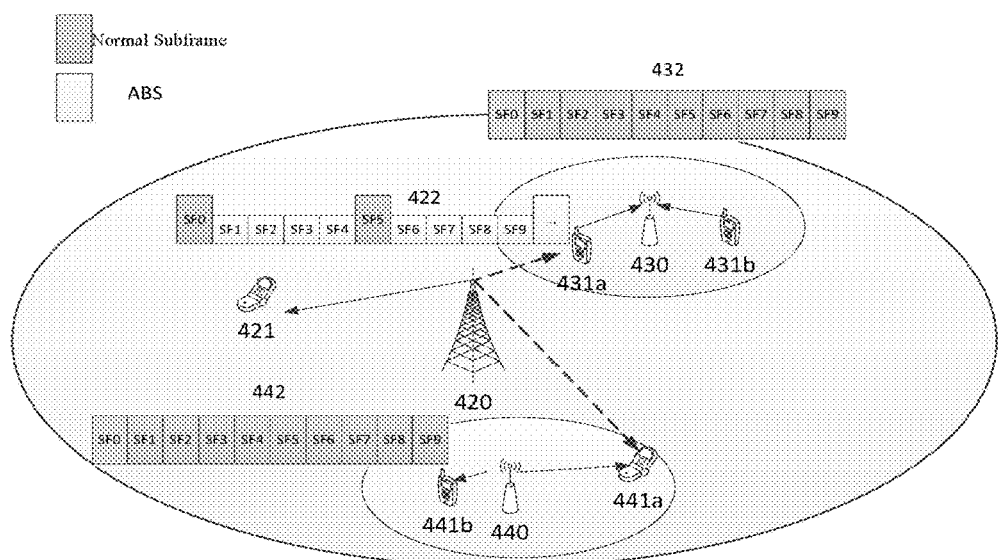
FIG. 9 is a schematic diagram illustrating another specific application example of the embodiment of the present disclosure.

Although the method shown in FIG. 8 is for the situation in which the home base station 320 is taken as the interfering base station, it can also be applied to the situation in which other base station (for example, the home base station 330) is taken as the interfering base station. Further, the method shown in FIG. 8 can be applied to the scenario in which other type of base stations constitute a wireless communication heterogeneous network, for example, the scenario in which the macro base station and the pico base station coexist, and the interfering base station is a macro base station, as shown in FIG. 9.

Furthermore, although the method shown in FIG. 8 is for the situation of configuring periodically, it can also be applied to the situation of configuring by other way.

In step S201, the home base station 320 sets the predetermined signal indicator $S_0$ and the predetermined interfering indicator $I_0$, and the parameter list comprising parameters for configuring the macro base station 330 to send ABS, such as the parameter list shown in FIG. 2. $S_0$ is used to represent the predetermined lower limit of the performance of receiving services by the user terminal 321 in the home base station 320, and $I_0$ is used to represent the predetermined upper limit of the interfered degree of the user terminal 341a interfered by the home base station 320 in the macro base station 340.

In step S202, the total traffic amount $T_{non-interfered\_UE}$ of the user terminal 321 served by the home base station 320 is calculated, and the total traffic amount $T_{interfered\_UE}$ of the user terminal 341a served by the macro base station 340 and interfered by the home base station 320 is calculated, further, the ratio between the total traffic amount of the interfered user and the total traffic amount of the un-interfered user is calculated as the relative traffic amount $T_r$, referring to equation 1:

$$T_r = \frac{\sum T_{interfered\_UE}}{\sum T_{non-interfered\_UE}} \quad (1)$$

In step S203, if the traffic amount $T_r$ is increased, it is represented that the edge performance of the macro base station 340 should be more valued, the requirement on the edge performance of the macro base station 340 should be improved, and the requirement on the total throughput of the home base station 320 should be properly decreased, so as to decrease the predetermined signal indicator $S_0$ and the predetermined interfering indicator $I_0$.

If the traffic amount $T_r$ is decreased, it is represented that the total throughput of the home base station 320 should be more valued, the requirement on the total throughput of the home base station 320 should be improved, and the requirement on the edge performance of the macro base station 340 should be properly decreased, so as to increase the predetermined signal indicator $S_0$ and the predetermined interfering indicator $I_0$.

The relationship between the specific decreasing amount and increasing amount of the predetermined signal indicator $S_0$ and the predetermined interfering indicator $I_0$ and the relative traffic amount $T_r$ can be calculated according to a particular function. For example, an example association way is that the relationship between the specific decreasing amount and increasing amount of the predetermined signal indicator $S_0$ and the predetermined interfering indicator $I_0$ and the relative traffic amount $T_r$ are linear negative correlated.

In step S202, also, the amount n1 of the user terminals 321 served by the home base station 320 can be calculated, the amount n2 of the user terminals 341a served by the macro base station 340 and interfered by the home base station 320 can be calculated, so that the quantity ratio between the amount of the interfered user and the amount of the un-interfered user can be calculated as the relative quantity a.

Correspondingly, in step S203, if the relative quantity a is increased, it is represented that the edge performance of the macro base station 340 should be more valued, the requirement on the edge performance of the macro base station 340 should be improved, and the requirement on the total throughput of the home base station 320 should be properly decreased, so as to decrease the predetermined signal indicator $S_0$ and the predetermined interfering indicator $I_0$.

If the relative quantity a is decreased, it is represented that the total throughput of the home base station 320 should be more valued, the requirement on the total throughput of the home base station 320 should be improved, and the requirement on the edge performance of the macro base station 340 should be properly decreased, so as to increase the predetermined signal indicator $S_0$ and the predetermined interfering indicator $I_0$.

The relationship between the specific decreasing amount and increasing amount of the predetermined signal indicator $S_0$ and the predetermined interfering indicator $I_0$ and the relative quantity a can be calculated according to a particular function. For example, an example association way is that the relationship between the specific decreasing amount and increasing amount of the predetermined signal indicator $S_0$ and the predetermined interfering indicator I0 and the relative quantity a is linear negative correlated.

The processes of steps S201-S203 can be executed by the aforementioned configuration unit 103, 123 or 233.

In step S204, each user terminal 321 of the home base station 320 measures the received signal from the home base station 320, and reports to the home base station 320 the indicator indicating the communication quality of the user terminal 321 served by the home base station 320, the indicator may include, for example, the reference signal reception power (may be RSRP for the previous versions of 3GPP Release 10, or may be CSI-RSRP for 3GPP Release 10 and later versions) and the indicator indicating the communication quality when receiving signals from the home base station 320. In a TD-LTE (Time Division Long Term Evolution) system, the indicator can also include coupling loss of link parameter. The indicator can be provided to the above first information acquisition unit 101, 122 or 222 by the home base station 320.

Furthermore, the indicator indicating the communication quality of the user terminal 321 served by the home base station 320 can includes, for example, the ratio between the reference signal reception power of the user terminal 321 for the home base station 320 and the sum of the reference signal reception powers of the user terminal 321 for all base stations. The indicator may also be the weighted sum of the included parameters.

In step S205, each user terminal 341 of the macro base station 340 measures the received signals of all base stations, if the case is that the reference signal reception power with respect to the base station other than the macro base station 340 is greater than the reference signal reception power with respect to the macro base station 340 by a certain preset percentage (for example, 50%), the user terminal is recognized as the user terminal being interfered by the base station other than the macro base station 340. Thereby, the user terminals 341a, 341b that are interfered by the home base station 320 can be recognized from the user terminals 341 served by the macro base station 340. The interfered user terminals 341a, 341b may both be one or more user terminals. The recognized user terminals 341a that is interfered by the home base station 320 reports the indicator indicating the interfered degree of the user terminals 341a to the macro base station 340, the indicator may include, for example, the reference signal reception power and the communication quality indicator of the home base station 320. In a TD-LTE system, the indicator can also include coupling loss of link parameter. The indicator can be provided to the above second information acquisition unit 102, 132 or 232 by the macro base station 340.

Furthermore, the indicator indicating the interfered degree of the user terminal 341a interfered by the home base station 320 may include, for example, the ratio between the reference signal reception power of the user terminal 341a for the home base station 320 and the sum of the reference signal reception powers of the user terminal 341a for all base stations. The indicator may also be the weighted sum of the included parameters.

In step S206, the signal indicator S as an example of the first information according to an embodiment of the present disclosure is calculated based on the indicator indicating the communication quality of the user terminal 321 served by the home base station 320 acquired in step S204. Specially, when the indicators indicating the communication quality of respective user terminals 321 are provided respectively by a plurality of user terminals 321, the weighted sum of these indicators can be obtained as the indicator S according to the importance of respective user terminals 321, or the average value of these indicators can be obtained as the indicator S, or the indicator S can be calculated by other suitable ways. The process can be executed by the aforementioned first information acquisition unit 101, 122 or 222.

Furthermore, in step S206, the interference indicator I as an example of the second information according to an embodiment of the present disclosure is calculated based on the indicator indicating the interfered degree of the user terminal 341a interfered by the home base station 320 acquired in step S205. Specially, when the indicators indicating the interfered degree of respective user terminals 341a are provided respectively by a plurality of user terminals 341a, the weighted sum of these indicators can be obtained as the indicator I according to the importance of respective user terminals 341a, or the average value of these indicators can be obtained as the indicator I, or the indicator I can be calculated by other suitable ways. The process can be executed by the aforementioned second information acquisition unit 101, 122 or 222.

In step S207, a comparison is made between the signal indicator S and the predetermined signal indicator $S_0$, if $S<S_0$, the ABS sent by the home base station 320 is configured by selecting a parameter pair consisted of larger silence ratio and smaller power reduction amount from the parameter table in step S208, so as to improve the total throughput of the home base station 320. It should be noted that, the description herein is made by taking the parameter pair list in FIG. 2 as an example. As mention above, in the parameter pair table shown in in FIG. 2, the parameter pair consisted of smaller silence ratio and larger power reduction amount may result in better edge performance of the macro base station 340 and smaller total throughput of the home base station 320.

Similarly, in step S207, a comparison is made between the interference indicator I and the predetermined interference indicator $I_0$, if $I>I_0$, the ABS sent by the home base station 320 is configured by selecting a parameter pair consisted of smaller silence ratio and larger power reduction amount from the parameter table in step S208, so as to improve the edge performance of the macro base station 340.

If $S≥S_0$ and $I≤I_0$, that is, the signal indicator S is equal or greater than the predetermined signal indicator $S_0$ which is the lower limit of the signal indicator S and the interference indicator I is less than or equal to the predetermined interference indicator $I_0$ which is the upper limit of the interference indicator I, the parameters of the ABS is not adjusted. At this time, the predetermined signal indicator $S_0$ and the predetermined interference indicator $I_0$ may be properly adjusted as required, so as to put forward higher requirements to the total throughput of the home base station 320 and the edge performance of the macro base station 340.

If $S<S_0$ and $I>I_0$, it is represented that neither the total throughput of the home base station 320 nor the edge performance of the macro base station 340 could satisfy the predetermined requirements. At this time, the predetermined signal indicator $S_0$ and the predetermined interference indicator $I_0$ may be properly adjusted as required, so as to decrease requirements on the total throughput of the home base station 320 and the edge performance of the macro base station 340. Since this case may be result from failure, an error message may be sent in this case.

The processes of steps S207 and S208 can be executed by the aforementioned configuration unit 103, 123 or 233.

When step S208 is done, the process may proceed to the next period.

It should be noted that, in order to prevent the aforementioned "ping-pong effect" when configuring the ABS, the comparison between the signal indicator S and the predetermined signal indicator S0 may not be made when the variation amount of the signal indicator S is less than a predetermined value (for example, less than 5%), so that the silence ratio and the power reduction amount of the ABS may not be not adjusted. Similarly, when the variation amount of the interference indicator I is less than a predetermined value (for example, less than 5%), the comparison between the interference indicator I and the predetermined interference indicator I0 may not be made, so that the silence ratio and the power reduction amount of the ABS may not be adjusted. In this case, to prevent the situation in which the signal indicator S or the interference indicator I continuously change with a variation amount less than a predetermined threshold, resulting in a large accumulated variation amount, such that the configuration with respect to the silence ratio and the power reduction amount of the ABS remains unchanged, it may be set that, when the variation amount of the interference indicator I or the signal indicator S is continuously less than a predetermined threshold for predetermined times (for example, 5 times), a comparison is made between the interference indicator I and the predetermined interference indicator I0 or between the signal indicator S and the predetermined signal indicator S0

Furthermore, as mentioned above, the "ping-pong effect" when configuring the ABS may be prevented by adopting other suitable mechanism.

FIG. 9 illustrates another example of the embodiment of the present disclosure. In this scenario, the macro base station 420 and the pico base station 430, 440 coexist. As an interfering base station, the macro base station 420 brings interference on the user terminals 431a, 431b, 441a and 441b of the pico base station 430, 440.

The macro base station 420 provides services to the user terminal 421, the pico base station 430 provides services to the user terminal 431a and 431b, and the pico base station 440 provides services to the user terminal 441a and 441b.

Since the pico base station 430, 440 and the macro base station 420 all adopt an open user access manner, the macro base station 420 may bring interference on the user terminal 431a of the pico base station 430 and the user terminal 441a of the pico base station 440 in the edge region of the pico base station 430, 440.

Similar to FIG. 7, in FIG. 9, a solid line with an arrow represents that a base station provides services to the user terminal, and a broken line with an arrow represents that a base station brings interference on the user terminal.

Those skill in the art should understand that, different base stations may interfere with each other, for example, a possible situation is that the pico base station 430, 440 bring interference on the macro base station 420. Those skilled in the art can select the way of sending ABS according to specific situation to restrain interference between base stations.

As shown in FIG. 9, the macro base station 420 sends subframes through the design pattern 422 with ABS, so as to improve the edge performance of the pico base station 430, 440. Meanwhile, the pico base station 430, 440 send subframes without ABS through the design pattern 432, 442.

Furthermore, in the design pattern 422, the power of a subframe is schematically represented by the height of the subframe. It is observed from FIG. 9 that the macro base station 420 sends four ABSs each time when sending one normal subframe. According to an embodiment of the present disclosure, the silence ratio and the power reduction amount by which the macro base station 420 sends ABS may be the parameter pairs in the lists shown in FIG. 3

Those skill in the art should understand that, the apparatus 10 in FIG. 1 may be included in the macro base station 420, or be included in the pico base station 430 or 440. Furthermore, as shown in FIG. 4, the macro base station 420 as the interfering base station comprises the first information acquisition unit 122 and the configuration unit 123, and the pico base station 430 and/or 440 comprises the second information acquisition unit 132, or as shown in FIG. 5, the macro base station 420 as the interfering base station comprises the first information acquisition unit 222, and the pico base station 430 and/or 440 comprises the second information acquisition unit 232 and the configuration unit 233.

Similar to the example shown in FIG. 7, the method shown in FIG. 8 can be used to periodically configure the method by which the macro base station 420 sending ABS in the example shown in FIG. 9. It should be noted that, in the example shown in FIG. 9, the macro base station 420 is the interfering base station, and the pico base stations 430, 440 are the base stations providing services to the user terminals interfered by the macro base station 420.

Through the above description made with respect to the example shown in FIG. 9, those skill in the art will appreciate that, the embodiments of the present disclosure may be performed with respect to the wireless communication in which the user terminals served by one or more base stations are interfered. In this case, the ABS may be configured based on the information detected by the interfered user terminals and served by the unused base stations.

5. Hardware Configuration Example

Respective component units and devices in the above mentioned apparatus, network and basestation according to embodiments of the present disclosure can be configured by way of software, firmware, hardware, or any of combinations thereof. In the case of software or firmware implementation, programs constituting the software or firmware are installed to a machine with a dedicated hardware structure (such as the common machine 700 shown in FIG. 10) from a storage medium or a network, wherein the machine can execute various corresponding functions of the component units, subunits when being installed various programs.

Figure 10:
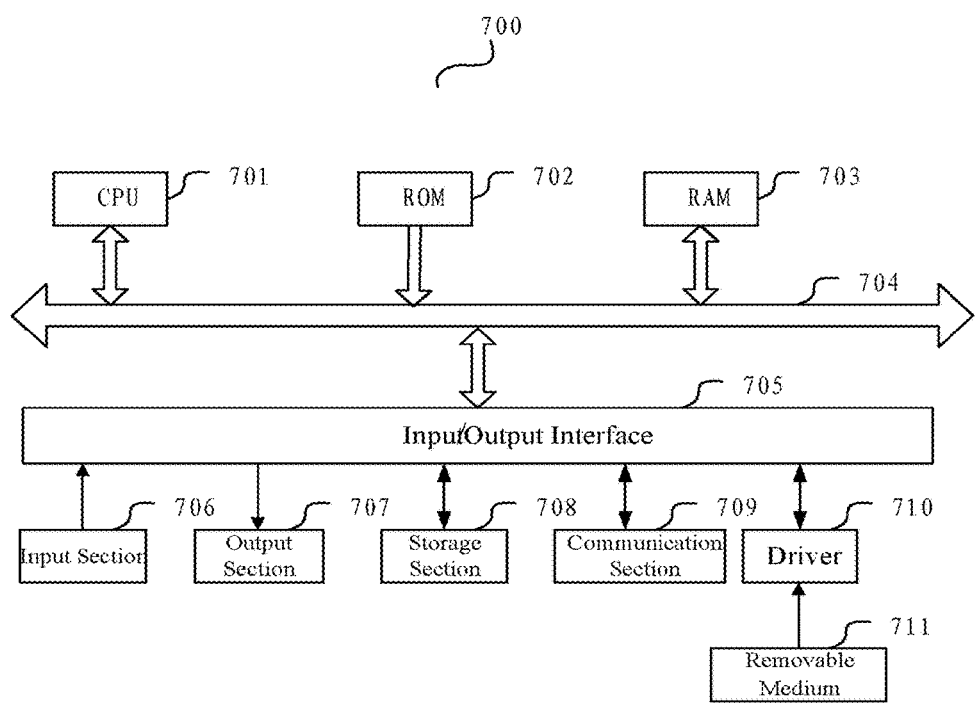
FIG. 10 is a schematic diagram illustrating an example of the hardware configuration according to an embodiment of the present disclosure.

In FIG. 10, a central processing unit (CPU) 701 executes various processes according to programs stored in a read only memory (ROM) 702 or programs loaded from the storage section 708 to the random access memory (RAM) 703. In RAM 703, the data required when CPU 701 executes various processes is stored as necessary. CPU 701, ROM 702 and RAM 703 are connected to each other via a bus 704. Input/output interface 705 is also connected to a bus 704.

The following parts are also connected to the input/output interface 705: an input section 706 (including a keyboard, mouse, etc.), an output section 707 (including a display, such as a cathode ray tube (CRT), liquid crystal display (LCD), etc. and a speaker, etc.), a storage section 708 (including a hard disk, etc.), a communication section 709 (including a network interface card such as a LAN card, modem, etc.). The communication section 709 performs a communication process via a network such as Internet. If necessary, a drive 710 can also be connected to the input/output interface 705. Removable media 711 such as a magnetic disk, an optical disk, a magneto-optical disk, a semiconductor memory or the like may be mounted on the drive 710 as required, such that a computer program read out therefrom may be installed into the storage section 708 as required.

In case of realizing the above mentioned series of processing by software, a program constituting the software can be installed from a network such as Internet or from a storage medium such as the removable medium 711.

Those skilled in the art should understand that, the storage medium is not limited to the removable storage medium 711 shown in FIG. 10 that stores programs therein and is distributed separately from the device to provide a program to a user. Examples of the removable storage medium 711 include a magnetic disk (including a floppy disk), an optical disc (including a compact disc read-only memory (CD-ROM) and a digital versatile disk (DVD)), a magneto-optical disk (including a mini disk (MD) (Registration trademarks) and a semiconductor memory. Otherwise, the storage medium may be the ROM 702, a hard disk contained in the storage section 708, etc., which have programs stored therein and are distributed to users together with the device including them.

Furthermore, the present disclosure provides a program product in which machine readable instruction codes are stored. The processing method according to embodiments of the present disclosure can be executed when the instruction code is read and executed by the machine. Accordingly, various storage medium such as a magnetic disk, optical disk, magneto-optical disk, a semiconductor memory for carrying such a program product is also included in the technology solution of the present disclosure.

Additionally, it is obvious that each operational procedure of the processing method according to the present disclosure can also be realized in the form of a computer-executable program stored in various machine-readable storage media.

It should be noted that, the respective constituent units or constituent device of the apparatus, network and base station according to the present disclosure may be independent parts, and the function of several constituent units or constituent apparatus can also be implemented by one part.

The present disclosure discloses not only the apparatus for configuring ABS in a wireless communication heterogeneous network, the wireless communication heterogeneous network, the method for configuring ABS in a wireless communication heterogeneous network, and the program for executing the method and the storage medium having the program storied therein, but also the base station comprising the apparatus for configuring ABS in a wireless communication heterogeneous network.

The preferred embodiments of the present disclosure are described above, however, the above description is just to illustrate the present disclosure, and does not intend to limit the present disclosure. Those skilled in the art can make alternation, substitution, combination, and partial combination to various features of embodiments of the present disclosure without departing from the scope of the present disclosure. The scope of the present disclosure should be limited to the appended claims.

The invention claimed is:

1. An apparatus in a wireless communication network, comprising:
a communication interface configured to
acquire first information associated with an indicator indicating communication quality reported by first user terminals served by a first base station; and
acquire second information associated with an indicator indicating communication quality reported by second user terminals served by a second base station based on measurement reports of the second user terminals; and
a processor configured to configure, based on the first information and the second information, at least one of a silence ratio and power reduction amount of Almost Blank Subframe (ABS) transmission of the first base station for inter-base station coordination by performing selection from a parameter table comprising predetermined parameter pairs of silence ratio and power reduction amount of ABS.

2. The apparatus according to claim 1, wherein the indicator indicating the communication quality reported by the second user terminals is associated with Reference Signal Receiving Power (RSRP) of a reference signal from the second base station measured by the second user terminals.

3. The apparatus according to claim 2, wherein the communication interface is further configured to acquire the second information via an interface between the first base station and the second base station.

4. The apparatus according to claim 1, wherein:
the indicator indicating communication quality of the first user terminals served by the first base station is associated with at least one of Reference Signal Receiving Power (RSRP), Communication Quality Indicator, RSRP based on channel state information and coupling loss of link when the first user terminals served by the first base station receive signals of the first base station.

5. The apparatus according to claim 1, wherein:
the indicator indicating the communication quality of the second user terminals is associated with at least one of Reference Signal Receiving Power (RSRP), Communication Quality Indicator, RSRP based on channel state information and coupling loss of link when the second user terminals receive signals of the second base station.

6. The apparatus according to claim 1, wherein:
the processor is further configured to periodically adjust at least one of the silence ratio and power reduction amount of Almost Blank Subframe (ABS).

7. The apparatus according to claim 1, wherein:
the apparatus is implemented as the first base station.

8. A wireless communication method comprising:
acquiring first information associated with communication quality measurement reported by first user terminals served by a first base station;
acquiring second information associated with communication quality measurement reported by second user terminals served by a second base station; and
configuring, based on the first information and the second information, at least one of a silence ratio and power reduction amount of Almost Blank Subframe (ABS) transmission of at least one of the first base station and second base station for inter-base station coordination by performing selection from a parameter table comprising predetermined parameter pairs of silence ratio and power reduction amount of ABS.

9. The method of claim 8, wherein the communication quality measurement reported by the first user terminals and the second user terminals comprise at least one of Reference Signal Receiving Power (RSRP), Communication Quality Indicator, RSRP based on channel state information and coupling loss of link.

10. The method of claim 8, wherein the configuring comprises:
configuring radio resource of the transmission of the first base station and the second base station.

11. An apparatus in a wireless communication system, comprising:
processing circuitry configured to
generate first information indicating communication quality with a first base station; and
generate second information indicating an amount of interference imparted on the apparatus from a second base station, wherein
the first information and the second information comprise at least one of measurement information of Reference Signal Receiving Power (RSRP), channel state information, and combinations thereof; and
a communication interface configured to
report the first information and the second information to the first base station; and
communicate the first base station based on a coordinated transmission configuration that includes a result of adjusting transmission of at least one of the first base station and the second base station for inter-base station coordination based on the first information and the second information.

* * * * *